United States Patent
Amano et al.

(10) Patent No.: US 10,447,123 B2
(45) Date of Patent: Oct. 15, 2019

(54) APPARATUS FOR INSERTING MAGNET INTO ROTOR IRON CORE

(71) Applicant: MITSUI HIGH-TEC, INC., Kitakyushu-shi, Fukuoka (JP)

(72) Inventors: Katsumi Amano, Fukuoka (JP); Hisatomo Ishimatsu, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 167 days.

(21) Appl. No.: 15/245,337

(22) Filed: Aug. 24, 2016

(65) Prior Publication Data

US 2017/0070128 A1 Mar. 9, 2017

(30) Foreign Application Priority Data

Sep. 4, 2015 (JP) .................. 2015-174827

(51) Int. Cl.
*H02K 15/03* (2006.01)
*H02K 1/27* (2006.01)

(52) U.S. Cl.
CPC .............. *H02K 15/03* (2013.01); *H02K 1/27* (2013.01)

(58) Field of Classification Search
CPC ................................ H02K 15/03; H02K 1/27
See application file for complete search history.

(56) References Cited

U.S. PATENT DOCUMENTS

| | | | | |
|---|---|---|---|---|
| 4,587,721 A | * | 5/1986 | Muller | H02K 1/278 29/596 |
| 4,597,168 A | * | 7/1986 | Oboshi | B21D 28/22 29/596 |
| 9,979,264 B2 | * | 5/2018 | Ishimatsu | B29C 45/14467 |
| 2014/0196276 A1 | | 7/2014 | Nagai et al. | |
| 2017/0070128 A1 | * | 3/2017 | Amano | H02K 1/27 |

FOREIGN PATENT DOCUMENTS

| | | |
|---|---|---|
| CN | 102611258 | 7/2012 |
| CN | 103929023 | 7/2014 |
| JP | 54-074202 | 5/1979 |
| JP | 2008-113530 | 5/2008 |
| JP | 2010-268580 | 11/2010 |
| JP | 2014-18071 | 1/2014 |
| JP | 2015-65810 | 4/2015 |

OTHER PUBLICATIONS

Chinese Official Action issued in CN Application No. 201610796744.8, dated Jun. 1, 2018 and English translation thereof.
Office Action issued in Japan Counterpart Patent Appl. No. 2015-174827, dated Apr. 23, 2019, along with an English translation thereof.

* cited by examiner

*Primary Examiner* — Minh N Trinh
(74) *Attorney, Agent, or Firm* — Greenblum & Bernstein, P.L.C.

(57) ABSTRACT

An apparatus for inserting a magnet into a rotor iron core includes a magnet inserting unit configured to insert a permanent magnet into a magnet-insert hole formed along a lamination direction of a rotor iron core body in which a plurality of iron core pieces are laminated, and a guide member to be attached to the magnet inserting unit, and arranged in a space formed between the magnet inserting unit and the rotor iron core body and configured to communicate the magnet-insert hole of the rotor iron core body to a supply part for the permanent magnet formed in the magnet inserting unit.

5 Claims, 3 Drawing Sheets

APPARATUS FOR INSERTING MAGNET INTO ROTOR IRON CORE

CROSS REFERENCE TO RELATED APPLICATION(S)

This application is based upon and claims the benefit of priority of Japanese Patent Application No. 2015-174827 filed on Sep. 4, 2015, the contents of which are incorporated herein by reference in its entirety.

BACKGROUND OF THE INVENTION

1. Field of the Invention

The present invention relates to an apparatus and a method for inserting a magnet into a rotor iron core, in which a permanent magnet is inserted into a magnet-insert hole of a rotor iron core body in which a plurality of iron core pieces are laminated.

2. Description of the Related Art

In manufacture of a rotor iron core, a rotor iron core body is manufactured by laminating plural iron core pieces, and a permanent magnet is inserted into a magnet-insert hole formed along a lamination direction of the rotor iron core body and then, a resin is injected into the magnet-insert hole to fix the permanent magnet.

When the permanent magnet is inserted into the magnet-insert hole in this manner, the permanent magnet may abut on, for example, the vicinity of an inlet of the magnet-insert hole to cause cracks or chips in the permanent magnet, with the result that accurate positioning of the permanent magnet and the magnet-insert hole is desired.

Hence, the following technique is proposed.

For example, JP-A-2008-113530 as Patent Literature 1 discloses a technique for inclining a rotor iron core body (rotor core) placed on a table together with the table to an angle at which a permanent magnet (magnet material) does not slip off inside a magnet-insert hole (magnet hole) and inserting the permanent magnet into the magnet-insert hole in this state and returning the inclined table and rotor iron core body to a horizontal state (that is, a shaft center of the rotor iron core body is in a vertical state).

Also, a magnet inserting apparatus 80 shown in FIG. 3 is an apparatus in which a rotating unit 81 changes a shaft center of a rotor iron core body 82 from a vertical state to a horizontal state with the rotor iron core body 82 placed on a conveyance jig 83 and then a magnet inserting unit 84 inserts a permanent magnet 86 into a magnet-insert hole 85 of the rotor iron core body 82 whose shaft center is in the horizontal state.

Patent Literature 1: JP-A-2008-113530

SUMMARY OF THE INVENTION

However, the related-art technique described above cannot cope with the case of being necessary to insert the permanent magnet into the rotor iron core body with a different lamination thickness since the rotor iron core body with a preset lamination thickness is targeted for insertion of the permanent magnet. Concretely, since a distance between the rotating unit 81 and the magnet inserting unit 84 is constant in the magnet inserting apparatus 80 shown in FIG. 3, when a lamination thickness of the rotor iron core body into which the permanent magnet 86 is inserted is thin, a space is formed between the magnet inserting unit 84 and the rotor iron core body whose shaft center is in the horizontal state, and it becomes difficult to insert the permanent magnet 86 into the magnet-insert hole from the magnet inserting unit 84.

In addition, it is contemplated to prepare plural kinds of magnet inserting apparatuses for variety of lamination thicknesses of the rotor iron core bodies in order to stably insert the permanent magnet, but this is high in cost and is not economical. Also, it is contemplated to adjust a distance between the magnet inserting unit and the rotor iron core body whose shaft center is in the horizontal state by changing an attachment position of the rotating unit every time the lamination thickness is changed, but this has problems that workability is bad and productivity is decreased.

The present invention has been implemented in view of such circumstances, and a non-limited object of the present invention is to provide an apparatus and a method for inserting a magnet into a rotor iron core, in which a permanent magnet can be inserted into a magnet-insert hole economically with high workability in the case of manufacturing the rotor iron cores with different lamination thicknesses.

A first aspect of the present invention provides an apparatus for inserting a magnet into a rotor iron core, the apparatus including: a rotating unit that changes a shaft center of a rotor iron core body, in which a plurality of iron core pieces are laminated, from a vertical state to a horizontal state with the rotor iron core body placed on a conveyance jig; a magnet inserting unit that is separately arranged from the rotating unit and includes a supply part configured to supply and insert a permanent magnet into a magnet-insert hole formed along a lamination direction of the rotor iron core body whose shaft center is in the horizontal state by the rotating unit; and a guide member that is arranged in a space formed between the magnet inserting unit and the rotor iron core body whose shaft center is in the horizontal state and configured to communicate the magnet-insert hole of the rotor iron core body to the supply part of the magnet inserting unit.

The apparatus for inserting the magnet into the rotor iron core according to the first aspect of the present invention may be configured such that the guide member includes a magnet conveyance path formed as a through hole along in a horizontal direction when the guide member is attached to the magnet inserting unit.

The apparatus for inserting the magnet into the rotor iron core according to the first aspect of the present invention may be configured such that the guide member is prepared in variety for the rotor iron core bodies with different lamination thicknesses, and the guide member can be replaced according to a lamination thickness of the rotor iron core body targeted for insertion of the permanent magnet.

The apparatus for inserting the magnet into the rotor iron core according to the first aspect of the present invention may be configured such that the magnet inserting unit includes a magnet storing magazine in which a plurality of unloaded permanent magnets in a horizontal state are stacked and stored, and a push rod that pushes out the unloaded permanent magnets stored in the magnet storing magazine to the magnet-insert hole through the supply part.

The apparatus for inserting the magnet into the rotor iron core according to the first aspect of the present invention may be configured such that the rotating unit includes a rotating mechanism that rotates the rotor iron core body, whose shaft center is in the horizontal state, at a preset angle around the shaft center of the rotor iron core body.

A second aspect of the present invention provides an apparatus for inserting a magnet into a rotor iron core, the apparatus including: a magnet inserting unit configured to insert a permanent magnet into a magnet-insert hole formed along a lamination direction of a rotor iron core body in which a plurality of iron core pieces are laminated; and a guide member to be attached to the magnet inserting unit, and arranged in a space formed between the magnet inserting unit and the rotor iron core body and configured to communicate the magnet-insert hole of the rotor iron core body to a supply part for the permanent magnet formed in the magnet inserting unit.

The apparatus for inserting the magnet into the rotor iron core according to the second aspect of the present invention may be configured such that the magnet inserting unit is configured to insert the permanent magnet into the magnet-insert hole of the rotor iron core body through the guide member vertically or horizontally.

A third aspect of the present invention provides a method for inserting a magnet into a rotor iron core, the method including: changing a shaft center of a rotor iron core body, in which a plurality of iron core pieces are laminated, from a vertical state to a horizontal state with the rotor iron core body placed on a conveyance jig by a rotating unit; inserting a permanent magnet into a magnet-insert hole formed along a lamination direction of the rotor iron core body whose shaft center is in the horizontal state by a magnet inserting unit separately arranged from the rotating unit; and before inserting the permanent magnet, arranging a guide member in a space formed between the magnet inserting unit and the rotor iron core body whose shaft center is in the horizontal state, wherein the guide member has a thickness corresponding to the space, wherein the permanent magnet is inserted into the magnet-insert hole from a supply part for the permanent magnet formed in the magnet inserting unit through the guide member.

The method for inserting the magnet into the rotor iron core according to the third aspect of the present invention may be configured such that the guide member includes a magnet conveyance path formed as a through hole along in a horizontal direction when the guide member is attached to the magnet inserting unit, and the permanent magnet is inserted into the magnet-insert hole from the supply part of the magnet inserting unit through magnet conveyance path of the guide member.

The method for inserting the magnet into the rotor iron core according to the third aspect of the present invention may be configured such that the guide member is prepared in variety for the rotor iron core bodies with different lamination thicknesses, and the guide member is replaced according to a lamination thickness of the rotor iron core body targeted for insertion of the permanent magnet.

The method for inserting the magnet into the rotor iron core according to the third aspect of the present invention may be configured such that a plurality of unloaded permanent magnets in a horizontal state stacked and stored in a magnet storing magazine are pushed out to the magnet-insert hole through the supply part by a push rod.

The method for inserting the magnet into the rotor iron core according to the third aspect of the present invention may be configured such that the magnet-insert holes are divided into a plurality of groups, and the rotor iron core body whose shaft center is in the horizontal state is rotated by a preset angle, and the permanent magnets are sequentially inserted into the magnet-insert holes for each of the groups.

A fourth aspect of the present invention provides a method for inserting a magnet into a rotor iron core, the method including: arranging a guide member in a space formed between a magnet inserting unit and a rotor iron core body in which a plurality of iron core pieces are laminated, wherein the guide member has a thickness corresponding to the space; and then inserting a permanent magnet into a magnet-insert hole formed along a lamination direction of a rotor iron core body from a supply part of the magnet inserting unit through the guide member.

The method for inserting the magnet into the rotor iron core according to the fourth aspect of the present invention may be configured such that the permanent magnet is inserted into the magnet-insert hole of the rotor iron core body through the guide member vertically or horizontally.

In the apparatus for inserting the magnet into the rotor iron core according to the first aspect of the present invention and the method for inserting the magnet into the rotor iron core according to the third aspect of the present invention, the guide member is arranged in the space formed between the magnet inserting unit and the rotor iron core body whose shaft center is in the horizontal state by the rotating unit, with the result that the magnet-insert hole can easily be communicated to the supply part for the permanent magnet formed in the magnet inserting unit. Accordingly, in the case of manufacturing the rotor iron cores with different lamination thicknesses, for example, it is unnecessary to prepare the magnet inserting apparatus and also it is unnecessary to adapt the magnet inserting apparatus for each lamination thickness of the rotor iron core body, with the result that the permanent magnet can be inserted into the magnet-insert hole economically with high workability.

Particularly, when the guide member is prepared in variety for the rotor iron core bodies with different lamination thicknesses and the guide member is replaced according to the lamination thickness of the rotor iron core body, the permanent magnets can easily be inserted into the magnet-insert holes of the rotor iron core bodies with various lamination thicknesses.

In addition, in the apparatus for inserting the magnet into the rotor iron core according to the second aspect of the present invention and the method for inserting the magnet into the rotor iron core according to the fourth aspect of the present invention, the guide member is arranged in the space formed between the magnet inserting unit and the rotor iron core body, with the result that the magnet-insert hole can easily be communicated to the supply part for the permanent magnet formed in the magnet inserting unit, and the permanent magnet can be inserted into the magnet-insert hole economically with high workability.

DETAILED DESCRIPTION OF THE EXEMPLARY EMBODIMENTS

Figure 1A:
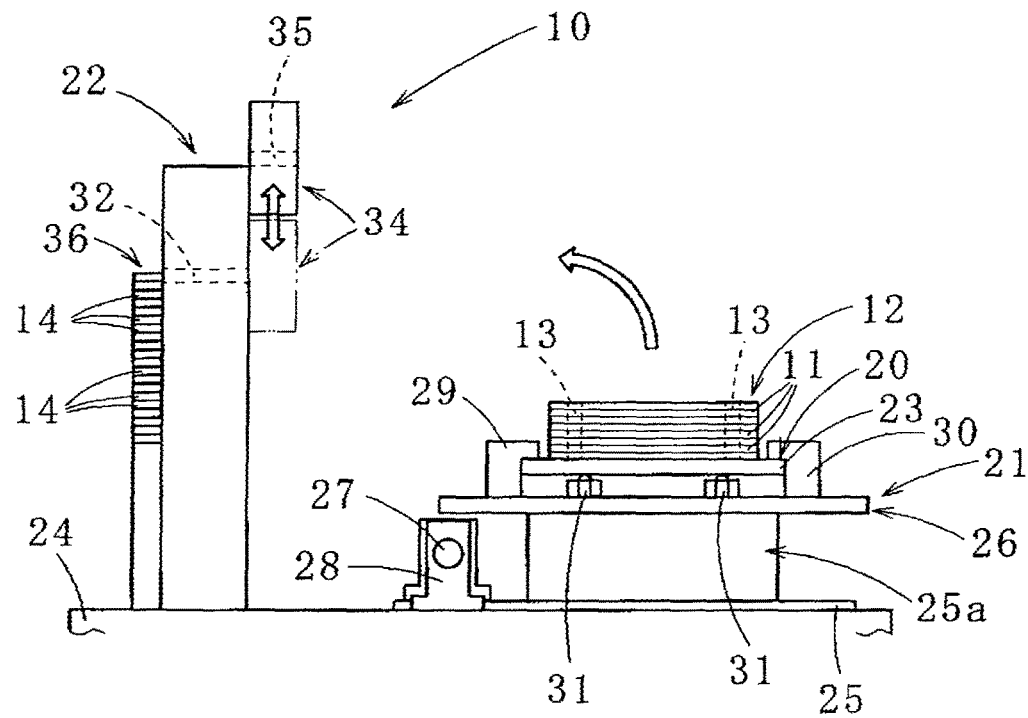
FIGS. 1A and 1B are explanatory diagrams of a use state of an apparatus for inserting a magnet into a rotor iron core according to one embodiment of the present invention, respectively.

Subsequently, an embodiment embodying the present invention will be described with reference to the accompanying drawings, and the present invention will be understood.

First, a rotor iron core (rotor core) manufactured using an apparatus for inserting a magnet into the rotor iron core according to one embodiment of the present invention will be described with reference to FIGS. 1A and 1B.

The rotor iron core has a rotor iron core body 12 constructed by laminating a plurality of annular (or predetermined shaped) iron core pieces 11. In addition, the rotor iron core body can be constructed by sequentially rotating and laminating plural block iron cores formed by laminating the plural annular iron core pieces.

The iron core piece 11 has an annular integral structure. In addition, the iron core piece may have a divided structure capable of annularly joining plural circularly arcuate iron core piece parts, or a structure capable of connecting a part of the plural circularly arcuate iron core piece parts in a circumferential direction by a joining part and folding this joining part to be formed in an annular shape.

The iron core piece 11 is blanked and formed from a thin plate material (thin metal sheet) made of, for example, an amorphous material or an electromagnetic steel plate with a thickness of about 0.10 to 0.5 mm. In addition, the iron core piece may be a piece blanked from one thin plate material, or a piece blanked from plural (for example, two, or three or more) stacked thin plate materials.

The iron core pieces 11, 11 adjacent in a lamination direction are mutually joined by caulking bonding, but can be joined using any one or two or more of caulking, a resin (a thermosetting resin (for example, an epoxy resin) or a thermoplastic resin), an adhesive and welding.

The center of the rotor iron core (rotor iron core body 12) is formed with a shaft hole (shaft hole), and plural magnet-insert holes 13 formed in the lamination direction of the rotor iron core (rotor iron core body 12) are formed in the periphery around the shaft hole. A permanent magnet 14 is fixed to the magnet-insert hole 13 using the resin described above.

In addition, the rotor iron core (rotor iron core body 12) is further formed with plural weight reduction holes (not shown) pierced in the lamination direction in the periphery of the rotor iron core around the shaft hole.

Subsequently, the apparatus (hereinafter simply also called a magnet inserting apparatus) 10 for inserting the magnet into the rotor iron core according to one embodiment of the present invention will be described with reference to FIGS. 1A and 1B.

The apparatus 10 for inserting the magnet into the rotor iron core is an apparatus which includes a rotating unit 21 for changing a shaft center of the rotor iron core body 12 from a vertical state to a horizontal state with the rotor iron core body 12 placed on a conveyance jig 20 and a magnet inserting unit 22 for inserting the permanent magnet 14 (demagnetized) into the magnet-insert hole 13 of the rotor iron core body 12 whose shaft center is in the horizontal state by the rotating unit 21 and can insert the permanent magnet 14 economically with high workability even for the rotor iron core bodies with different lamination thicknesses. Hereinafter, description will be made in detail.

The conveyance jig 20 includes a placement table 23 on which the rotor iron core body 12 is placed, and a positioning rod (not shown) erected on the center of this placement table 23.

The placement table 23 has a square shape (quadrilateral shape) in plan view, but may have another shape (for example, a polygonal shape or a circular shape).

The positioning rod is means for positioning the rotor iron core body 12 placed on the placement table 23 by being fitted into the shaft hole of the rotor iron core body 12.

The rotating unit 21 has a rotating pedestal 25 which can be erected and is horizontally arranged on a base table 24, and a receiving table 26 formed on the rotating pedestal 25 through a rotating mechanism 25a.

The rotating pedestal 25 has a quadrilateral shape in plan view, and one end of the rotating pedestal 25 is provided with a rotating shaft 27. The rotating shaft 27 is rotatably supported in a bearing part 28 attached and fixed to the base table 24. Also, the base table 24 is provided with a pneumatic cylinder (actuator) (not shown), and an actuating part of the pneumatic cylinder is rotatably attached to the rotating pedestal 25.

Figure 1B:
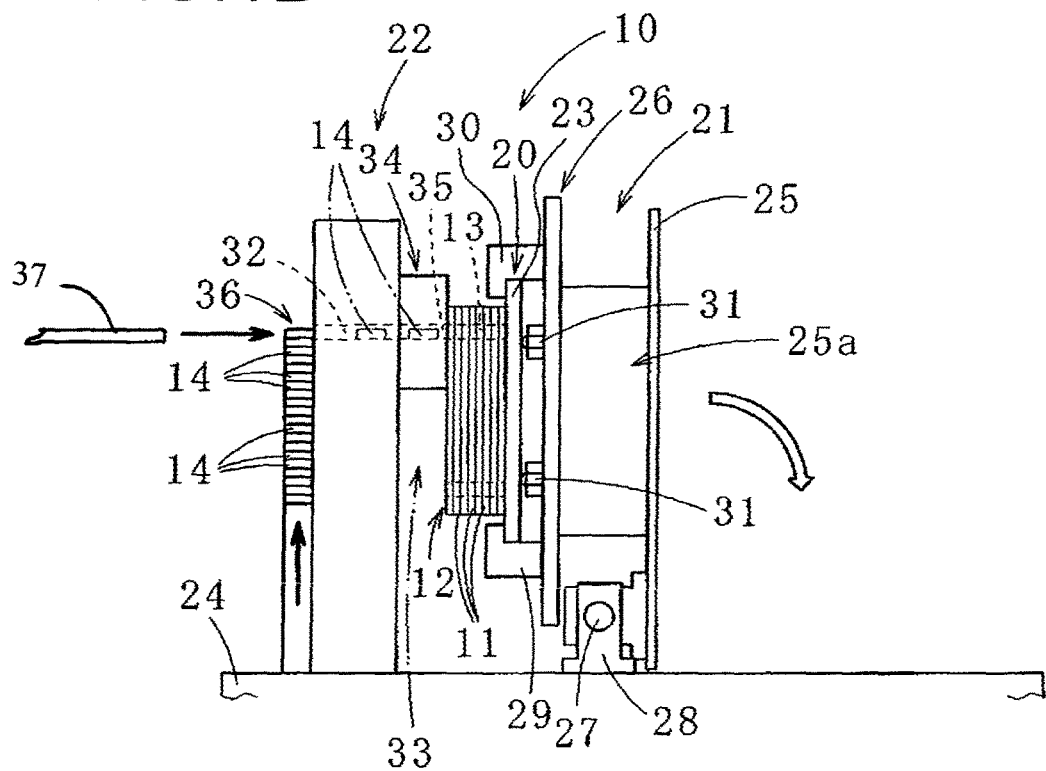

Accordingly, by expanding the pneumatic cylinder, the rotating pedestal 25 can be rotated around the rotating shaft 27 to be changed to a state (for example, 90° and also includes the case of being inclined in the range of ±5 (further, ±3) from 90°) vertical to the horizon as shown in FIG. 1B. Also, by contracting the pneumatic cylinder, the rotating pedestal 25 can be rotated around the rotating shaft 27 to be changed to a horizontal state (can be placed on the base table 24) as shown in FIG. 1A.

In addition, a configuration other than the rotating shaft 27, the bearing part 28 and the pneumatic cylinder can be used as long as the rotating pedestal 25 can be rotated as described above between the vertical state and the horizontal state.

The receiving table 26 has a quadrilateral shape in plan view, and both sides of one surface of the receiving table 26 in a width direction are provided with a pair of sidewall parts 29, 30. Each of the sidewall parts 29, has an inverted L-shaped cross section, and can slide and attach the conveyance jig 20 so as to pinch the placement table 23 from both sides in the width direction.

Also, plural guide rollers 31 capable of horizontally moving the placement table 23 with the placement table 23 placed are formed between the opposed sidewall parts 29, 30 of the receiving table 26.

Accordingly, the conveyance jig 20 is horizontally moved on the receiving table 26 by the plural guide rollers 31, and the conveyance jig 20 can be positioned on the receiving table 26 by the sidewall parts 29, 30 formed on both sides of one surface of the receiving table 26 in the width direction and lock mechanisms (not shown) formed on both sides of the other surface of the receiving table 26 in the width direction.

Consequently, in the case of rotating the rotating pedestal 25, the conveyance jig 20 can be prevented from slipping from the receiving table 26.

Also, the rotating mechanism 25a includes a driving part (for example, an air cylinder) for rotating the receiving table 26 with respect to the rotating pedestal 25 around a shaft center (corresponding to the shaft center of the rotor iron core body 12) of the receiving table 26, and a lock part for positioning the receiving table 26 with respect to the rotating pedestal 25 in this rotational position.

Accordingly, the rotor iron core body 12 whose shaft center is in the horizontal state can be rotated at a preset angle around the shaft center of the rotor iron core body 12.

The magnet inserting unit 22 is provided with a floating mechanism, and the magnet inserting unit 22 is erected on the base table 24 so that slight swing is enabled. Also, the magnet inserting unit 22 has a positioning mechanism including a guide block (not shown) capable of engaging with a hole part (for example, a weight reduction hole) formed in the rotor iron core body 12.

Accordingly, the magnet-insert hole 13 and a magnet conveyance path 35 of a guide member 34 described below can be positioned by engaging the guide block with the hole part of the rotor iron core body 12 while swinging the magnet inserting unit 22 by the floating mechanism.

Also, the magnet inserting unit 22 is separately arranged from the rotating unit 21 (oppositely arranged so as to have a distance from the receiving table 26 in an erected state), and the inside of the magnet inserting unit 22 is provided with plural magnet supply paths (one example of a supply part) 32 capable of sliding the short permanent magnet 14 in a length direction of the permanent magnet 14. In addition, each of the magnet supply paths 32 can be constructed of, for example, a groove part with a recessed cross section, but is not limited to this groove part. Also, instead of the short permanent magnet 14 described above, a long permanent magnet can be supplied to the magnet supply path 32.

The number of magnet supply paths 32 formed in the magnet inserting unit 22 is set in the same number (for example, a divisor of the total number of magnet-insert holes 13) as the number of magnet-insert holes 13 constructing each group in the case of dividing all the magnet-insert holes 13 formed in the rotor iron core body 12 into a plurality of groups. As a result, in the case of inserting the permanent magnets 14 into the magnet-insert holes 13, the rotor iron core body 12 is rotated by a preset angle by the rotating mechanism 25a described above and the permanent magnets 14 are sequentially inserted into the magnet-insert holes 13 for each group of the rotor iron core body 12 whose shaft center is in the horizontal state.

In addition, an installation position of the magnet supply path 32 corresponds to a formation position of the magnet-insert holes 13 constructing each group in the rotor iron core body 12 whose shaft center is in the horizontal state.

Also, the number of magnet supply paths 32 formed in the magnet inserting unit 22 can be set in the same number as the number of magnet-insert holes 13. In this case, it is unnecessary to rotate the rotor iron core body 12 by the rotating mechanism 25a described above since the permanent magnets 14 can be inserted into the magnet-insert holes 13 simultaneously (at once).

A distance between the magnet inserting unit 22 and the rotating unit 21 described above, that is, a distance between the magnet inserting unit 22 and the receiving table 26 in an erected state is set according to a lamination thickness of the rotor iron core body targeted for insertion of the permanent magnet 14, and is herein set based on the rotor iron core body with the thickest lamination thickness. Concretely, the distance is set to the extent (there may be a gap) to which an upper surface (one end face) of the rotor iron core body abuts on the magnet inserting unit 22 when the shaft center of the rotor iron core body is in the horizontal state (for example, see FIG. 3).

As a result, even when a shape of the rotor iron core body 12 in a direction of the shaft center in plan view is the same as that of the rotor iron core body with the thickest lamination thickness, in the case of attempting to insert the permanent magnet 14 into the rotor iron core body 12 with a lamination thickness thinner than that of this rotor iron core body, a space 33 is formed between the magnet inserting unit 22 and the rotor iron core body 12 whose shaft center is in the horizontal state.

Hence, an upper part of the side of the rotating unit 21 in the magnet inserting unit 22 (the outlet side of the permanent magnet 14 of the magnet supply path 32) is provided with the guide member 34 capable of being upwardly and downwardly moved along a surface of the side of the rotating unit 21 in the magnet inserting unit 22.

The guide member 34 includes a thickness corresponding to the space 33, and the inside of the guide member 34 is provided with the magnet conveyance path 35 (for example, a groove part with a recessed cross section) capable of sliding the permanent magnet 14 in a length direction of the permanent magnet 14. The number of magnet conveyance paths 35 is the same number as the number of magnet supply paths 32 formed in the magnet inserting unit 22 (the number of magnet-insert holes 13 constructing each group).

Accordingly, by arranging the guide member 34 in the space 33 described above, the magnet-insert hole 13 can be communicated to the magnet supply path 32 of the permanent magnet 14 through the magnet conveyance path 35.

In addition, at a regular time, the guide member 34 waits in an upper part of the magnet inserting unit 22 as shown in FIG. 1A, whereas in use time, the guide member 34 is downwardly moved to a position of communication between the magnet supply path 32 and the magnet conveyance path 35 along the surface of the side of the rotating unit 21 in the magnet inserting unit 22 as shown in FIG. 1B. However, a waiting position of the guide member 34 is not limited to this position, and can also be set in, for example, a lower part or lateral part of the side of the rotating unit 21 in the magnet inserting unit 22.

Also, the number of the guide members is not limited to one, and a plurality kinds of guide members (the same number as kinds of the rotor iron core bodies) are preferably prepared in variety for the rotor iron core bodies with different lamination thicknesses.

In this case, the guide member can be replaced according to the lamination thickness of the rotor iron core body targeted for insertion of the permanent magnet. In addition, the guide member may be replaced and attached to the magnet inserting unit every time the lamination thickness of the rotor iron core body is changed and also, the plural guide members can be previously disposed on the side of the rotating unit in the magnet inserting unit to be selected and used every time the lamination thickness of the rotor iron core body is changed.

The magnet inserting unit 22 includes a magnet storing magazine 36 in which the unloaded permanent magnets 14 are stored, formed on each of the magnet supply paths 32, and a push rod 37 for pushing out the unloaded permanent magnets 14 stored in the magnet storing magazine 36.

The magnet storing magazine 36 is a long container, and is formed on the side (inlet side of the permanent magnet 14 in the magnet supply path 32) opposite to the rotating unit 21, and the plural permanent magnets 14 in a horizontal state are stacked and are stored. The plural stacked permanent magnets 14 are regularly urged upwardly, and the permanent magnet 14 located in the uppermost part corresponds to a position of the magnet supply path 32 in front view.

Also, the push rod (for example, a push pin) is means for pushing out the permanent magnet 14 stored in the magnet storing magazine 36 and located in the uppermost part to the magnet-insert hole 13 through the magnet supply path 32 and the magnet conveyance path 35.

A push-out action of the push rod is performed one time or plural (two or more) times with respect to one magnet-insert hole 13 based on a length of the permanent magnet 14 and a depth of the magnet-insert hole 13 (that is, one or plural (two or more) permanent magnets 14 are inserted into one magnet-insert hole 13).

Each of the actions of the pneumatic cylinder, the rotating mechanism, the guide member 34 and the push rod shown above is performed based on a previously inputted program by a command from a controller (not shown).

In addition, instead of the apparatus 10 for inserting the magnet into the rotor iron core described above, an apparatus (hereinafter simply also called a magnet inserting apparatus) 40 for inserting a magnet into a rotor iron core shown in FIG. 2 can be used. Since some members constructing the apparatus 40 for inserting the magnet into the rotor iron core are substantially similar to the members constructing the apparatus 10 for inserting the magnet into the rotor iron core described above, detailed description is omitted by assigning the same numerals to the same members.

The magnet inserting apparatus 40 is an apparatus for inserting a permanent magnet 14 into a magnet-insert hole 13 of a rotor iron core body 12 by a magnet inserting unit 41 (having a function similar to that of the magnet inserting unit 22 described above) in a state in which a shaft center of the rotor iron core body 12 is maintained in a vertical state. In addition, this magnet inserting apparatus 40 is constructed so that the permanent magnet 14 can be inserted into the magnet-insert hole 13 by auxiliary means (not shown) so as to prevent the permanent magnet 14 from abutting on, for example, the vicinity of an inlet of the magnet-insert hole 13 to cause cracks or chips in the permanent magnet 14 when the permanent magnet 14 is inserted into the magnet-insert hole 13.

A base table 42 is provided with a horizontal placing unit 43.

The horizontal placing unit 43 includes a receiving table 26 formed on the base table 42 through a rotating mechanism 25a.

Accordingly, the rotor iron core body 12 whose shaft center is in the vertical state can be rotated with the rotor iron core body 12 placed on a conveyance jig 20 at a preset angle around the shaft center of the rotor iron core body 12.

The magnet inserting unit 41 is oppositely arranged so as to have a distance from the horizontal placing unit 43 (receiving table 26) by support members 44 erected on the base table 42, and the inside of the magnet inserting unit 41 is provided with plural magnet supply paths 32 capable of moving the permanent magnet 14 in a length direction of the permanent magnet 14.

A distance between the magnet inserting unit 41 and the horizontal placing unit 43 (receiving table 26) is set based on the rotor iron core body with the thickest lamination thickness like the distance between the magnet inserting unit 22 and the rotating unit 21 described above.

As a result, in the case of attempting to insert the permanent magnet 14 into the rotor iron core body 12 with a lamination thickness thinner than that of the rotor iron core body with the thickest lamination thickness, a space 33 is formed between the magnet inserting unit 41 and the rotor iron core body 12 whose shaft center is changed vertically.

Hence, the lower side of the magnet inserting unit 41 (the side of the horizontal placing unit 43, the outlet side of the permanent magnet 14) is provided with a guide member 34 capable of being moved along a lower surface of the magnet inserting unit 41.

At a regular time, the guide member 34 waits in a position (a region which does not overlap with the rotor iron core body 12) of the radial outside of the rotor iron core body 12 in plan view, whereas in use, the guide member 34 is moved to a position of communication between the magnet supply path 32 and a magnet conveyance path 35 along the lower surface of the magnet inserting unit 41.

Subsequently, a method for inserting a magnet of a rotor iron core according to one embodiment of the present invention will be described with reference to FIGS. 1A and 1B.

The method for inserting the magnet into the rotor iron core is a method capable of inserting the permanent magnet 14 economically with high workability even for the rotor iron core bodies with different lamination thicknesses, and has an iron core body manufacturing step, a preparing step, a rotating step, and a magnet inserting step.

Hereinafter, description will be made in detail.

(Iron Core Body Manufacturing Step)

The rotor iron core body 12 formed by laminating the plural iron core pieces 11 is manufactured, and the rotor iron core body 12 is placed on the conveyance jig 20. At this time, a positioning rod of the conveyance jig 20 is fitted into the shaft hole of the rotor iron core body 12, and the rotor iron core body 12 is attached in a predetermined position of the placement table 23 of the conveyance jig 20.

In addition, the conveyance jig 20 may be arranged in a die apparatus for manufacturing the rotor iron core body 12 to sequentially laminate the iron core pieces 11 inside the die apparatus.

(Preparing Step)

Here, the necessity of use of the guide member 34 is determined according to a lamination thickness of the rotor iron core body targeted for insertion of the permanent magnet 14. Concretely, the step is as follows.

Figure 3:
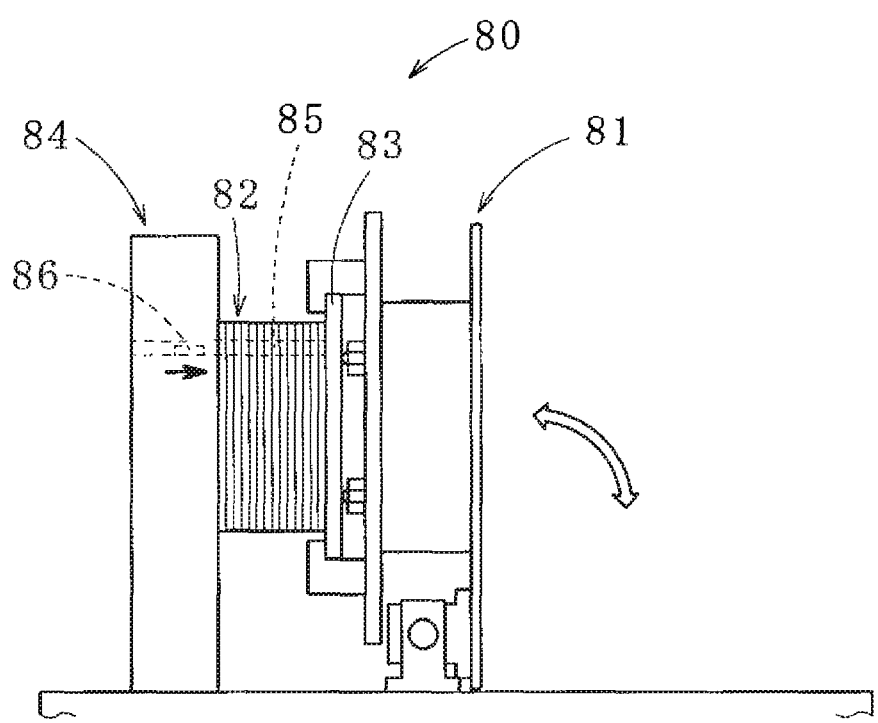
FIG. 3 is an explanatory diagram of a use state of an apparatus for inserting a magnet into a rotor iron core according to a conventional example.

When no space is formed between the magnet inserting unit and the rotor iron core body whose shaft center is in the horizontal state, that is, when an upper surface (one end face) of the rotor iron core body substantially abuts on the magnet inserting unit 22, the guide member is maintained in a waiting position (like the situation of FIG. 3).

On the other hand, when the space 33 is formed between the magnet inserting unit 22 and the rotor iron core body 12 whose shaft center is in the horizontal state as shown in FIGS. 1A and 1B, the guide member 34 waiting in an upper part of the magnet inserting unit 22 is downwardly moved to a position of communication between the magnet supply path 32 and the magnet conveyance path 35 along a surface of the magnet inserting unit 22, and is arranged in the space 33.

In addition, preferably, plural kinds of guide members 34 are prepared in variety for the rotor iron core bodies with different lamination thicknesses and are replaced according to the lamination thickness of the rotor iron core body targeted for insertion of the permanent magnet 14.

(Rotating Step)

The conveyance jig 20 on which the rotor iron core body 12 is placed is horizontally moved on the receiving table 26 by the guide rollers 31 formed on the receiving table 26 of the rotating unit 21, and the conveyance jig 20 is positioned on the receiving table 26 by the sidewall parts 29, 30 and the lock mechanisms.

Then, by expanding the pneumatic cylinder, the rotating pedestal 25 is changed to a state vertical to the horizon as shown in FIG. 1B. Accordingly, with the rotor iron core body 12 placed on the conveyance jig 20, the shaft center of the rotor iron core body 12 is changed from a vertical state to a horizontal state.

At this time, the upper surface (one end face) of the rotor iron core body 12 whose shaft center is in the horizontal state abuts on a surface of the side of the rotating unit 21 in the guide member 34 (there may be a slight gap). This can provide communication between the magnet-insert hole 13, the magnet conveyance path 35 of the guide member 34, and the magnet supply path 32 of the permanent magnet 14 formed in the magnet inserting unit 22.

(Magnet Inserting Step)

By the magnet inserting unit 22, the permanent magnet 14 (demagnetized) is inserted into the magnet-insert hole 13 of the rotor iron core body 12 whose shaft center is in the horizontal state. Concretely, the step is as follows.

The permanent magnets 14 stacked in a horizontal state and stored in the magnet storing magazine 36 are pushed out to the magnet-insert hole 13 through the magnet supply path 32 and the magnet conveyance path 35 by the push rod.

In addition, since the number of magnet supply paths 32 formed in the magnet inserting unit 22 and the number of magnet conveyance paths 35 formed in the guide member 34 are respectively the same number (or, a divisor) as the number of magnet-insert holes 13 constructing each group described above, the rotor iron core body 12 is rotated by a preset angle by the rotating mechanism 25a, and the permanent magnets 14 are sequentially inserted into the magnet-insert holes 13, for each group, of the rotor iron core body 12 whose shaft center is in the horizontal state.

After insertion of the permanent magnets 14 into the magnet-insert holes 13 of the rotor iron core body 12 is completed, by contracting the pneumatic cylinder, the rotating pedestal 25 is changed to a horizontal state as shown in FIG. 1A. Accordingly, with the rotor iron core body 12 placed on the conveyance jig 20, the shaft center of the rotor iron core body 12 is changed from the horizontal state to the vertical state.

At this time, the guide member 34 is upwardly moved to a waiting position of the upper part of the magnet inserting unit 22 along the surface of the magnet inserting unit 22.

Then, the conveyance jig 20 on which the rotor iron core body 12 is placed is detached from the receiving table 26, and with this rotor iron core body 12 placed on the conveyance jig 20, the rotor iron core body 12 is conveyed to the next step. Then, in this step, a resin is injected into each of the magnet-insert holes 13 and is cured to thereby fix the permanent magnet 14 to each of the magnet-insert holes 13.

The rotor iron core can be obtained by detaching the conveyance jig from the rotor iron core body 12 obtained in the steps described above.

Figure 2:
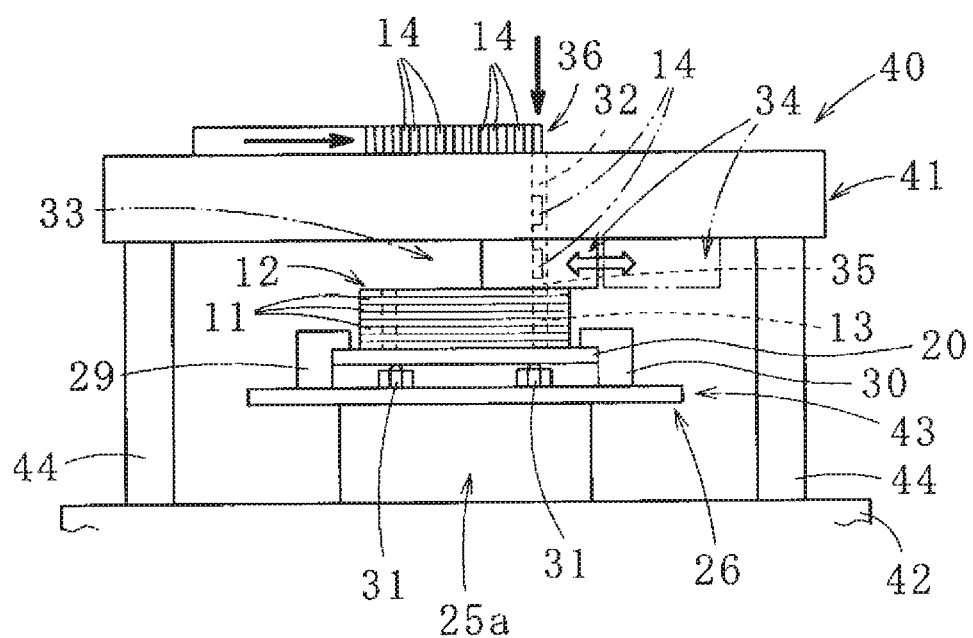
FIG. 2 is an explanatory diagram of a use state of an apparatus for inserting a magnet into a rotor iron core according to another embodiment of the present invention.

In addition, in the case of using the apparatus 40 for inserting the magnet into the rotor iron core shown in FIG. 2, the rotor iron core can be obtained by performing a method substantially similar to that of the case of using the apparatus 10 for inserting the magnet into the rotor iron core except the permanent magnet 14 is inserted into the magnet-insert hole 13 of the rotor iron core body 12 by the magnet inserting unit 41 in a state in which the shaft center of the rotor iron core body 12 is maintained in the vertical state.

Concretely, the shaft center of the rotor iron core body 12 is maintained in the vertical state without changing a direction of the shaft center of the rotor iron core body 12 in the rotating step and the magnet inserting step described above.

Consequently, by using the apparatus and the method for inserting the magnet into the rotor iron core, the permanent magnet can be inserted into the magnet-insert hole economically with high workability in the case of manufacturing the rotor iron cores with different lamination thicknesses.

The present invention has been described above with reference to the embodiment, but the present invention is not limited to the configuration described in the embodiment described above, and also includes other embodiments and modified examples contemplated within the scope of the matter described in the claims. For example, the case of constructing the apparatus and the method for inserting the magnet into the rotor iron core according to the present invention by combining a part or all of the respective embodiments and modified examples described above is also included in the scope of right of the present invention.

The embodiment described above describes the case of setting the distance between the magnet inserting unit and the rotating unit based on the rotor iron core body with the thickest lamination thickness, but can also be set according to a lamination thickness of a rotor iron core body which has a lamination thickness thicker than that of the thickest rotor iron core body and intends to insert the permanent magnet in future. In this case, the guide member is used also in the case of inserting the permanent magnet into the rotor iron core body with the thickest lamination thickness described above.

Also, the embodiment described above describes the case of arranging the guide member in the space before the rotating step, but as long as the guide member is arranged before the magnet inserting step, arrangement of the guide member is not particularly limited and, for example, the guide member can also be arranged between the rotating step and the magnet inserting step.

And, the embodiment described above describes the case of causing the permanent magnet located in the uppermost part of the magnet storing magazine to correspond to the position of the magnet supply path in front view, but the permanent magnet located in the lowermost part of the magnet storing magazine can also be caused to correspond to the position of the magnet supply path in front view. In this case, every time the permanent magnet located in the lowermost part is pushed out to the side of the magnet supply path, the permanent magnet located just over the lowermost part is located in the lowermost part by gravity. In addition, the permanent magnet may be pushed out to the side of the magnet supply path without using the magnet storing magazine.

Further, the embodiment described above describes the case of inserting the permanent magnet into the magnet-insert hole of the rotor iron core body in a state in which the shaft center of the rotor iron core body is changed from the vertical state to the horizontal state or the shaft center of the rotor iron core body is maintained in the vertical state, but the permanent magnet can also be inserted into the magnet-insert hole of the rotor iron core body in a state in which the shaft center of the rotor iron core body is inclined (the shaft center is inclined to the horizon at any angle from 0 to 90°).

What is claimed is:

1. An apparatus for inserting a magnet into a rotor iron core, the apparatus comprising:
   a rotator configured to change a shaft center of a rotor iron core body, in which a plurality of iron core pieces are laminated, from a vertical state to a horizontal state, with the rotor iron core body held on the rotator, by rotating about an axis of the rotator;
   a magnet inserter configured to cooperate with the rotator, the magnet inserter and the rotator being separately supported on a support portion of the apparatus, and the magnet inserter including a supplier configured to supply and insert a permanent magnet into a magnet-insert hole formed along a lamination direction of the rotor iron core body whose shaft center is oriented in the horizontal state by rotating the rotator about the axis thereof; and
   a guide member that is configured to be arranged in a space formed between an opposing surface of the magnet inserter and an opposing surface of the rotor iron core body whose shaft center is in the horizontal state and configured to move along the opposing surface of the magnet inserter in a direction perpendicular to the lamination direction of the rotor iron core body so as to communicate the magnet-insert hole of the rotor iron core body to the supplier of the magnet inserter.

2. The apparatus for inserting the magnet into the rotor iron core according to claim 1, wherein the guide member includes a magnet conveyance path formed as a through hole along in a horizontal direction when the guide member is attached to the magnet inserter.

3. The apparatus for inserting the magnet into the rotor iron core according to claim 1, wherein the guide member is configured to be prepared in variety for the rotor iron core bodies with different lamination thicknesses, and the guide member is configured to be replaced according to a lamination thickness of the rotor iron core body targeted for insertion of the permanent magnet.

4. The apparatus for inserting the magnet into the rotor iron core according to claim 1, wherein the magnet inserter includes a magnet storing magazine in which a plurality of unloaded permanent magnets in a horizontal state are stacked and stored, and a push rod that pushes out the unloaded permanent magnets stored in the magnet storing magazine to the magnet-insert hole through the supplier.

5. The apparatus for inserting the magnet into the rotor iron core according to claim 1, wherein the rotator includes a rotating mechanism that rotates the rotor iron core body, whose shaft center is in the horizontal state, at a preset angle around the shaft center of the rotor iron core body.

* * * * *